United States Patent
Bivans et al.

(10) Patent No.: US 12,282,325 B2
(45) Date of Patent: *Apr. 22, 2025

(54) SYSTEMS AND METHODS FOR SAFETY-ENABLED CONTROL

(71) Applicant: Fort Robotics, Inc., Philadelphia, PA (US)

(72) Inventors: Nathan Bivans, Philadelphia, PA (US); Walid Dimachkie, Philadelphia, PA (US)

(73) Assignee: Fort Robotics, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,372

(22) Filed: Feb. 13, 2024

(65) Prior Publication Data

US 2024/0184251 A1 Jun. 6, 2024

Related U.S. Application Data

(63) Continuation of application No. 17/507,670, filed on Oct. 21, 2021, now Pat. No. 11,934,185, which is a continuation of application No. 17/183,116, filed on Feb. 23, 2021, now Pat. No. 11,181,870.

(60) Provisional application No. 62/982,615, filed on Feb. 27, 2020.

(51) Int. Cl.
*G05B 9/03* (2006.01)

(52) U.S. Cl.
CPC ..................... *G05B 9/03* (2013.01)

(58) Field of Classification Search
CPC ...................................... G05B 9/03
See application file for complete search history.

(56) References Cited

U.S. PATENT DOCUMENTS

| | | | | |
|---|---|---|---|---|
| 4,363,973 A * | 12/1982 | Kawata | ............ | F16H 61/12 180/170 |
| 6,109,568 A * | 8/2000 | Gilbert | ............ | B61L 23/005 246/2 R |
| 10,528,044 B2 * | 1/2020 | Emura | ............ | G05D 1/0061 |
| 2004/0148039 A1 * | 7/2004 | Farchmin | ............ | G05B 19/122 700/79 |
| 2004/0230329 A1 * | 11/2004 | Schwesig | ............ | G05B 9/03 700/83 |

(Continued)

*Primary Examiner* — Christopher E. Everett
(74) *Attorney, Agent, or Firm* — Run8 Patent Group, LLC; Peter Miller; Brian T. Chew

(57) ABSTRACT

Systems and methods for safety-enabled control by: establishing a wireless communication channel with a plurality of remote control units via the wireless interface device; in response to establishing the wireless communication channels, operating a system-under-control in a supervised mode based on input received from at least one of the plurality of remote control units; in response to a mode switch command received from a first remote control unit of the plurality of remote control units, providing the other remote control units with a request for a mode switch confirmation; and, in response to confirming receipt of a safety-rated input from an autonomous control system and receipt of a mode switch confirmation from each of the other remote control units, operating the system-under-control in an autonomous mode based on input received from the autonomous control system.

20 Claims, 6 Drawing Sheets

(56) References Cited

U.S. PATENT DOCUMENTS

| | | | | |
|---|---|---|---|---|
| 2010/0077031 | A1* | 3/2010 | Yoneda | H04W 4/80 |
| | | | | 709/227 |
| 2010/0127824 | A1* | 5/2010 | Moschl | G05B 19/4184 |
| | | | | 345/161 |
| 2010/0250023 | A1* | 9/2010 | Gudat | G05D 1/0278 |
| | | | | 701/2 |
| 2010/0292874 | A1* | 11/2010 | Duggan | G05D 1/0061 |
| | | | | 701/11 |
| 2012/0143482 | A1* | 6/2012 | Goossen | G08G 5/0034 |
| | | | | 701/120 |
| 2013/0270394 | A1* | 10/2013 | Downs | G05D 1/0027 |
| | | | | 283/67 |
| 2014/0055077 | A1* | 2/2014 | Barrass | G05B 9/02 |
| | | | | 318/700 |
| 2014/0214248 | A1* | 7/2014 | Yamada | B61L 27/20 |
| | | | | 701/20 |
| 2015/0198936 | A1* | 7/2015 | McGee | G05D 1/0061 |
| | | | | 700/40 |
| 2016/0124428 | A1* | 5/2016 | Nutaro | B64D 41/00 |
| | | | | 701/2 |
| 2016/0209840 | A1* | 7/2016 | Kim | B60W 60/0059 |
| 2016/0282845 | A1* | 9/2016 | Toda | G05B 19/409 |
| 2017/0192427 | A1* | 7/2017 | Bivans | B60L 3/12 |
| 2019/0004489 | A1* | 1/2019 | Stagg | G05B 19/048 |
| 2019/0049948 | A1* | 2/2019 | Patel | G05D 1/0027 |
| 2019/0078429 | A1* | 3/2019 | Zheng | H04W 4/00 |
| 2019/0143965 | A1* | 5/2019 | Driscoll | G05D 1/0022 |
| | | | | 701/41 |
| 2020/0361481 | A1* | 11/2020 | Whitfield, Jr. | B60K 28/00 |
| 2021/0061312 | A1* | 3/2021 | Wang | B60W 60/0015 |
| 2021/0276590 | A1* | 9/2021 | McGee | B60W 60/0025 |

\* cited by examiner

SYSTEMS AND METHODS FOR SAFETY-ENABLED CONTROL

CROSS-REFERENCE TO RELATED APPLICATIONS

This Application is a continuation of U.S. patent application Ser. No. 17/507,670, filed on 21 Oct. 2021, which is a continuation of U.S. patent application Ser. No. 17/183,116, filed on 23 Feb. 2021, which claims the benefit of U.S. Provisional Application No. 62/982,615, filed 27 Feb. 2020, each of which is incorporated herein in its entirety by this reference.

TECHNICAL FIELD

This disclosure relates generally to the system control field, and more specifically to a new and useful system and method in the system control field.

BACKGROUND

There is a need in the system control field to create improved control systems and methods. This disclosure provides such improved control systems and methods.

DESCRIPTION OF THE PREFERRED EMBODIMENTS

The following description of the preferred embodiments is not intended to limit the disclosure to these preferred embodiments, but rather to enable any person skilled in the art to make and use the disclosed embodiments.

1. Overview

Embodiments disclosed herein include systems and methods for safety-enabled control of one or more systems.

Figure 1A:
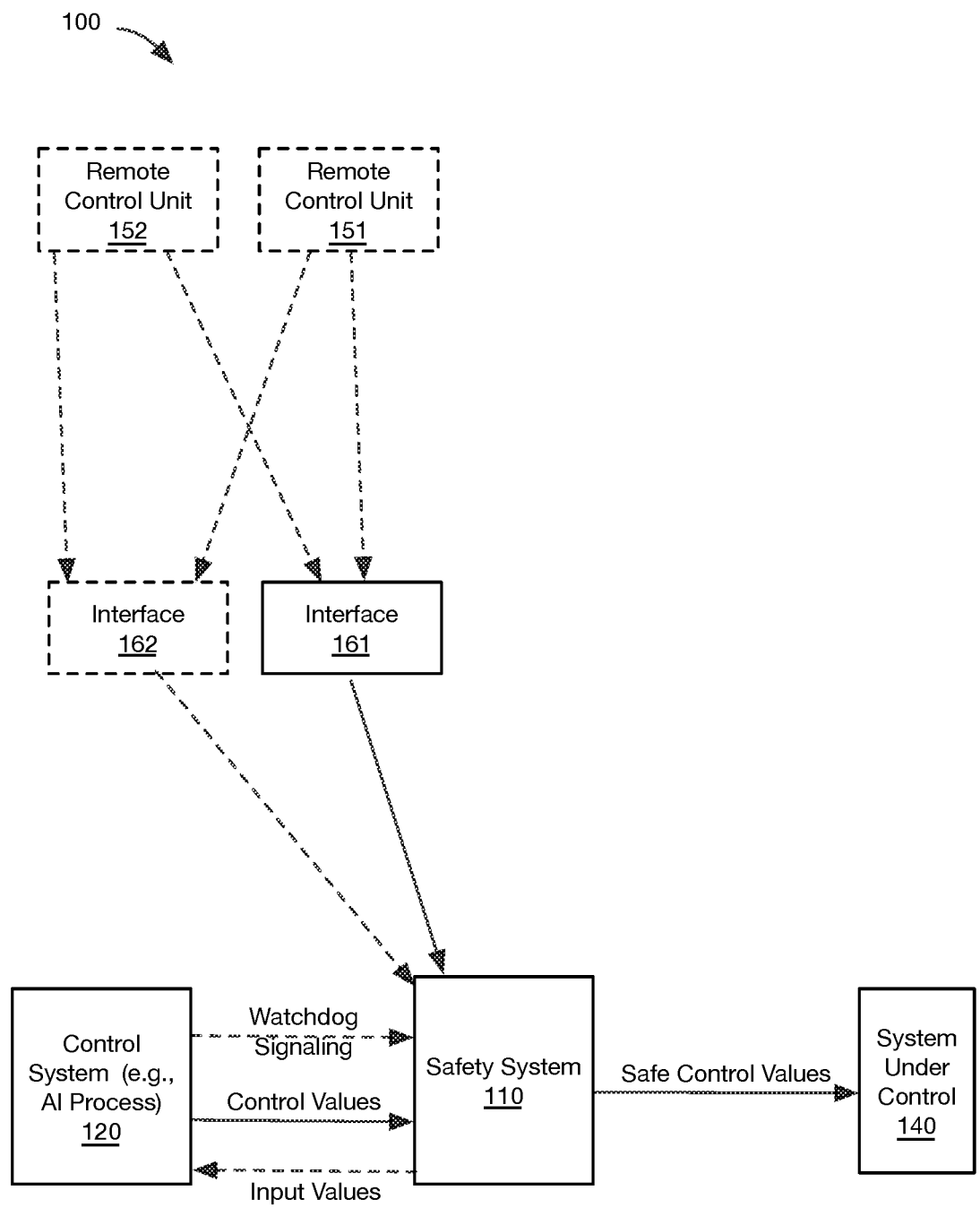
FIGS. 1A-C are schematic representation of the system, according to various embodiments.
Figure 1B:
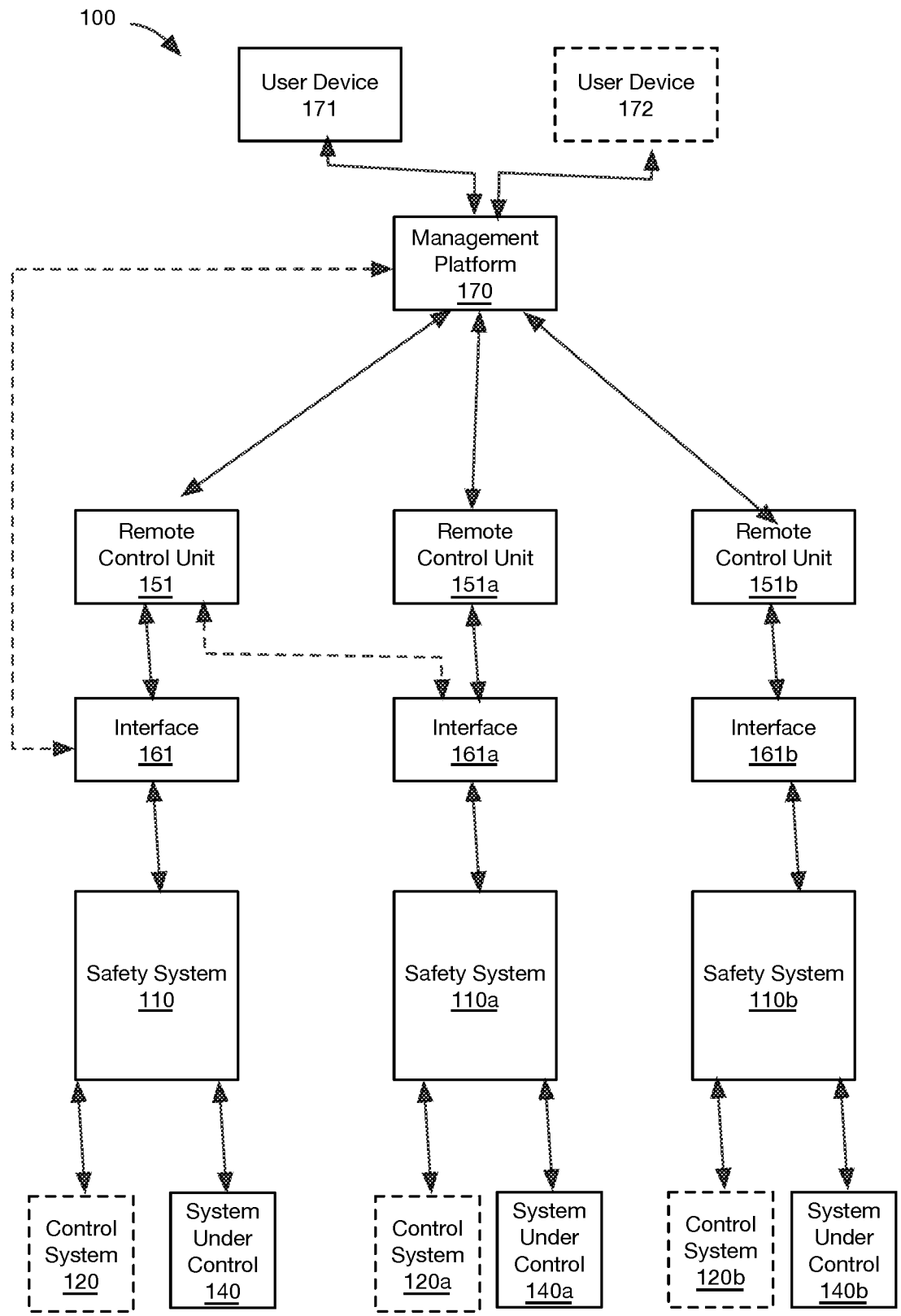

The system (e.g., 100) functions to provide safety-enabled control of another system or component. In some variations, the system 100 includes a safety system (endpoint controller) (e.g., 110 as shown in FIGS. 1A and 1B). In variants, the system 100 includes one or more of a control system (e.g., 120), an interface device (e.g., 161, 162), a remote control unit (e.g., 151), a system-under-control (e.g., 140), and a management platform (e.g., 170 shown in FIG. 1B).

In some variations, the method includes establishing communication with at least one system under control (e.g., S210); and operating a system-under-control (e.g., 140) S220. The method optionally includes switching an operating mode for operation of the system-under-control (S230).

2. Benefits

The embodiments disclosed herein can confer several benefits over conventional systems and methods.

First, by virtue of the system and method disclosed herein, switching operation in autonomous mode can be performed only after explicit authorization and intent to switch has been established.

Second, by virtue of the system and method disclosed herein, one or more systems can be controlled in a supervised mode from a single remote control unit or user device.

However, further benefits can be realized from the embodiments disclosed herein.

3. System

FIGS. 1A-B are schematic representations of the system, according to embodiments.

The system (e.g., 100) functions to provide safety-enabled control of another system or component. In some variations, the system 100 includes a safety system (e.g., 110 as shown in FIGS. 1A and 1B). In variants, the system 100 includes one or more of a control system (e.g., 120), an interface device (e.g., 161, 162), a remote control unit (e.g., 151), a system-under-control (e.g., 140), and a management platform (e.g., 170 shown in FIG. 1B).

In some variations, the safety system 110 is coupled to at least one of a control system 120, an interface device (e.g., 161, 162), a remote control unit (e.g., 151, 152), a system-under-control (e.g., 140), and a management platform (e.g., 170 shown in FIG. 1B). In an example implementation, the safety system 110 is included in a device that also includes at least one interface (e.g., 161, 162).

In a first variation, the system is a component of a larger system (e.g., a robot, a vehicle, a drone, an industrial system, a home system, a spaceborne system, etc.) that includes one or more components (e.g., motors, actuators, propulsion systems, etc.) that are controlled by the safety system (e.g., 100). In a second variation, the system is external to such larger systems, and controls one or more such larger systems (e.g., locally or remotely). For example, the system can function to remotely control a drone or autonomous vehicle, or a fleet of drones or autonomous vehicles.

In some variations, the system 100 is one or more of: a robot, a vehicle (e.g., autonomous, semi-autonomous, etc.), an industrial system (e.g., a manufacturing system, a farming system, a construction system, a waste processing system, a power system, a power generator, an environmental control system, a military system, a transportation system, etc.), a home system (e.g., HVAC, home automation, etc.). The system 100 can be a terrestrial system, or a space system (e.g., satellite, spacecraft, missile, space probe, space station, etc.).

The system (e.g., 100) can include a control system (e.g., 120) and a safety system (e.g., 110). In some implementations, the control system and the safety system are included in a safety-enabled control system that integrates the safety system with the control system (e.g., within a chipset, within an integrated circuit, within a microelectronic device package, within a silicon die, etc.). However, the control system and the safety system can be arranged within the system in any suitable manner (within separate hardware devices, separate chipsets, separate integrated circuits, separate microelectronic device packages, separate silicon die, etc.).

The control system 120 functions to provide control values to the safety system 110. In variants, the safety system 110 performs a command gating process to provide safe control values (e.g., original control values determined to be safe, new control values generated by the safety system, etc.) based on the control values received from the control system.

In some variations, the safety system functions to perform an input validation process and provide validated input data to the control system.

The system can optionally include one or more of: an interface device (e.g., 161, 162 shown in FIG. 1A, 161*a*, 161*b* shown in FIG. 1B). At least one interface device can be coupled to the safety system, such that that safety system can perform operations (e.g., a command gating process, an input validation process, etc.) based on data received via the interface device. Similarly, at least one sensor can be coupled to the safety system, such that that safety system can perform operations based on data received via the sensor.

Example sensors can include one or more of: a speed sensor, radar, steering position sensor, image sensor (e.g., 3D camera, 2D camera, multi-spectral camera, etc.), LIDAR, and the like. However, the system can include (or be coupled to) any suitable type of sensor.

In an example, the system is an integrated circuit (e.g., a chipset) that includes the control system, the safety system, and one or more interface devices (e.g., radios, wired network interface devices, etc.) coupled to the safety system.

Components of the system 100 can be coupled (e.g., communicatively coupled, electrically connected, etc.) in any suitable manner (e.g., via one or more of a bus, backplane, network, Network on a Chip), circuit board, silicon die, substrate, wires, solder, bus, communication link, a set of hardware registers, a communication port, a physical layer network interface, electrical connections, an electrical circuit, and the like.

Components of the system 100 can be arranged in any suitable manner (e.g., within one or more chipsets, within one or more microelectronic device packages, within one or more silicon die, etc.).

In some variations, the system 100 includes at least one interface device (e.g., 161, 162). In some implementations, the system includes two or more interface devices for communication with an external system. For example, a first interface device can be a primary interface device, and a second interface can be a backup interface device. In some variations, at least one interface device included the system 100 is a hardware device. Interface devices can include one or more of a wired interface device (for wired communication) and a wireless interface device (for wireless communication). Interface devices can support one or more protocols, such as, for example, universal serial bus (USB), Bluetooth, Wi-Fi, Ethernet, near field communication (NFC), LTE, ISM (Industrial, Scientific, Medical) and the like. In some implementations, at least one interface device is a radio (e.g., a receiver, transmitter, or transceiver). In some variations, wireless communications interfaces include interfaces for one or more of long range wireless communication, short range wireless communication, wireless communication between terrestrial and spaceborne systems, etc. Example radios include one or more of the following types of radios: WiFi, LTE, Bluetooth, NFC, ISM (Industrial, Scientific, Metical), satellite, shortwave, UHF, VHF, HF. However, interface devices can include any suitable type of radio.

In some implementations, the system includes two or more interface devices for communication with an external system. For example, a first interface device can be a primary interface device, and a second interface can be a backup interface device. In some implementations, the system includes one or more of a Wi-Fi radio, an LTE radio, an ISM radio, and a Bluetooth radio.

The system can optionally include at least one system under control 140. Alternatively, the system can be coupled (e.g., communicatively, electrically, etc.) to at least one external system under control 140.

The system-under-control 140 can be a hardware system, a software system, or a combination of hardware and software systems. Examples of the system-under-control 140 include motors, actuators, robots, vehicles (e.g., autonomous, semi-autonomous, etc.), industrial systems (e.g., manufacturing systems, farming systems, construction systems, waste processing systems, power systems, power generators, environmental control systems, military systems, transportation systems, etc.), home systems (e.g., HVAC, home automation, etc.). The system-under-control 140 can be a terrestrial system, or a space system (e.g., satellite, spacecraft, missile, space probe, space station, etc.).

In some variations, the system 100 can be coupled to an external system under control 140 in any suitable manner. In variants, the system 100 is coupled to the system under control 140 via a control interface. The control interface include one or more of: a bus, a network, a circuit board, wires, solder, communication link, a communication port, a physical layer network interface, electrical connections, an electrical circuit, and the like. By virtue of separating the control interface from the safety subsystem, design of the safety subsystem can be updated without requiring updates to the electrical (or logical) connection between the system 100 and an external system under control 140. In some implementations, the control interface is included in the safety system 110.

Control values generated by the control system 120 can be signals, data, commands, instructions, messages, or any suitable value that can affect control of the system-under-control 140.

The control system 120 can be an artificial intelligence (AI) control system, a machine-learning-based control system, a deterministic control system, or any suitable type of system that can generate control values. The control system 120 can be a distributed system, a multi-core processor, a single-core processor, a server, a circuit board, a chipset, a network appliance, a system on a chip (SoC), a circuit, a processor core, or any suitable type of hardware system.

In some implementations, the control system 120 can include one or more of a CPU core, a GPU (Graphics Processing Unit), an NPU (Neural Processing Unit), an Operating System, an industrial interface, a Wireless PAN (Personal Area Network) interface, a Wireless LAN interface, a Wired LAN interface, and a memory. In some variations, the control system 120 can include any suitable type of radio transceiver for wireless communications (e.g., long range wireless communication, short range wireless communication, wireless communication between terrestrial and spaceborne systems, etc.).

In some variations, the safety system 110 functions to prevent unsafe control values from reaching the system-under-control 140 from the control system 120.

In some variations, the safety system 110 is coupled (e.g., communicatively, electrically) to a system under control. In some implementations, the safety system 110 is interposed between the control system 120 and a control interface that functions to couple the system to the system under control 140. In some implementations, the control interface couples the system to the system under control 140 such that the system under control 140 only receives control values (safe control values) from the safety system, and cannot receive control values directly from the control system 120 (that are not first processed by the safety system).

In some variations, the safety system 110 is coupled (e.g., communicatively, electrically) to one or more input sources (e.g., remote control units 151, the control system 120, robots, vehicles, industrial systems, databases, web sites, information sources, news sources, traffic controllers, another system-under-control, or any other suitable input source), and uses input values received from at least one input source to determine a safety condition and optionally related safety information (e.g., safe and unsafe control values, an enable signal, etc.). The safety system 110 can be communicatively coupled to one or more input sources via an interface device (e.g., 162, 161). Input values can represent one or more of: an e-stop value, a speed, a radar value, a steering position, an operating mode, output from a 3D camera, output from a 2D camera, LIDAR data, auxiliary sensor data (such as from, e.g., a backup LIDAR, etc.), safety information from external systems, and any suitable type of information.

In some variations, input values can represent information provided by the control system 120, such as, for example, one or more of: a watchdog signal, a requested speed, a requested steering value, or any other suitable type of command or information provided by the control system.

The safety system 110 can include one or more of a machine learning model, a neural network, a rules engine, a rule set, a table, a database, etc. for determining the safety condition or safety information.

In some variations, redundancy and/or resiliency is provided by using a plurality of safety systems (e.g., 110). The system 100 can include a plurality of safety systems 110 that collectively function to prevent unsafe control values from reaching the system-under-control 140 from the control system 120. The plurality of safety systems can be isolated from each other. For example, the plural safety systems can be separate circuits, separate processors, separate processes running on separate processing cores, separate processes running in separate containers, etc.

In a first example, safety systems can be configured in series such that an output (control value) of a first safety system is provided as an input to a second safety system that performs redundant (or additional) safety checks. In a second example, safety systems can be configured in parallel such that outputs (control values) of each safety system are used to determine a safe control value to be sent to the system-under-control 140. For example, a voting algorithm can be applied to the outputs of the safety systems to determine the safe control value to be sent. However, safe control values can be otherwise determined by using outputs from one or more safety systems 110.

The safety system 110 can be an artificial intelligence (AI) safety system, a deterministic safety system, a rules-based safety system, or any suitable type of system that can block, filter, discard, or transform control values received from the control system 120. In some variations, the safety system is a deterministic safety system that has been tested, and certified by a safety certification authority (e.g., TUV (Technischer Überwachungsverein), Underwriters Laboratories) in accordance with standards set by a standards commission (e.g., the International Electromechanical Commission). In some variations, the safety system 110 can be a distributed system, a multi-core processor, a single-core processor, a server, a circuit board, a chipset, a network appliance, a system on a chip (SoC), or any suitable type of hardware system. In some variations, the safety system 110 is a module (that includes machine executable program instructions) executed by at least one processing core of a multi-core processor that also executes machine executable program instructions of the control system 120.

In some variations, the safety system 110 (or at least one component of the safety system) is a safety rated system that is rated by a safety certification authority (e.g., the International Electromechanical Commission).

In some variations, the safety system 110 (or at least one component of the safety system) is a hardcoded system whose functionality cannot be programmatically modified.

In some variations, the safety system 110 (or at least one component of the safety system) includes at least one processor (e.g., a hardware processor, a virtual processor running on a shared processor core, etc.). One or more of the safety system processors can be isolated or secured from the control system 120 by using dedicated (and optionally secured) system resources (e.g., memory locations, storage locations, hardware registers, busses, etc.). Such processors can be secured from executing malicious or invalid instructions (or accessing malicious or invalid data) from external systems by using one or more of a secure storage location, a secure memory, digitally signed program instructions, encryption, and the like. In this manner, operation of the safety system 110 can be secured from un-tested (or unverified) code running on the control system 120.

In some variations, at least one processor (e.g., 115) of the safety system 110 is constructed to load program instructions from a secure storage location into a secure memory location and execute the program instructions loaded into the secure memory location. In some implementations, the secure storage location is secured from access by external systems, such as the control system 120, such that the external systems cannot alter or add program instructions to the secure storage location. The secure storage location can be an EEPROM, a ROM, a circuit, a persistent storage device, etc.

In some variations, the safety system processor can load digitally signed instructions from an un-secured storage location, verify that the instructions have been signed by a valid signer, and upon verification, execute the instructions. In this manner, program instructions provided by external systems, that are not signed with a valid signature, are not executed by the safety system.

In some variations, the safety system 110 includes at least one safety application and a corresponding hardware interface (safety library) that interfaces the safety application with one or more processing cores. The processing cores can be coupled to a dedicated memory. The safety system 110 can include several independent safety applications, having isolated hardware interfaces, CPU cores and memory. The safety applications can communicate with each other via the respective hardware interfaces to perform inter-process diagnostics.

The safety application (safety core) can perform functionality of the safety system 110 as described herein. In some variations, the safety application can implement one or more of: input validation (for input received from input sources), and data and event logging with programmable triggers for high density recording (e.g., logging of input values, watchdog signaling values, control values, safe control values, etc.).

In some variations, the hardware interface can function to perform diagnostics and testing of hardware specific fault cases. In some implementations, the hardware interface is firmware specifically designed to allow a processor not specifically designed for functional safety to achieve high SIL (Safety Integrity Level). In some implementations, the hardware interface functions to detect hard or soft faults. In some implementations, the hardware interface includes an interface for communication with redundant safety applications, as well as communications to systems external to the safety system 110. In some implementations, the hardware interface includes modules to perform one or more of the following: internal bus structure tests; inter-process communication; I/O register tests; memory register tests; memory startup bit tests; memory hardware error monitoring; periodic CRC scanning for memory; CPU core timebase tests; CPU process sequence and timing monitoring; CPU core tests; CPU register tests, and the like. However, the hardware interface can perform any suitable type of safety test.

In some variations, the output of the control system 120 is hardcoded to an input of the safety system 110 such that the control system 120 cannot be altered, reprogrammed, or reconfigured to provide control values directly to the system-under-control 140. For example, an operating system, firmware, device driver, etc. of the control system 120 can automatically route control values to the safety system 110 regardless of the application code being executed by the control system 120. In some variations, the output of the control system 120 is hardwired to an input of the safety system 110 such that no electrical connection or network can couple a control value output from the control system 120 to the system-under-control 140. For example, a control system output (of the control system 120) that provides control values can be electrically coupled directly to the safety system 110, such that there is no electrical connection to the control system output that will permit control values from reaching the system-under-control 140 without first passing through the safety system 110. In this manner, command gating for control values of the control system 120 can be provided, regardless of the operation of the control system 120, such that control values generated by the control system 120 must pass through the safety system 110 (which can suppress or alter such control values).

In variants, each remote control unit is implemented as a hardware device that includes one or more of a processor (e.g., a CPU (central processing unit), GPU (graphics processing unit), NPU (neural processing unit), etc.), a display device, a memory, a storage device, an audible output device, an input device, an output device, and a communication interface. In some variations, one or more components included in the remote control unit are communicatively coupled via a bus. In some variations, one or more components included in the remote control unit are communicatively coupled to an external system (e.g., a safety system 110) via the communication interface (either directly or indirectly via another interface, e.g., 161 shown in FIGS. 1A and 1B).

The communication interface of the remote control unit functions to communicate data between the remote control unit and another device (e.g., a safety system 110) via a wireless network (e.g., a private network, a public network, the Internet, and the like).

In some variations, the storage device of the remote control unit includes the machine-executable instructions that, when executed by a processor of the remote control unit, control the remote control unit to perform at least a portion of the method 200 described herein.

The input device of the remote control unit functions to receive user input. In some variations, the input device includes at least one of buttons and a touch screen input device (e.g., a capacitive touch input device).

Figure 1C:
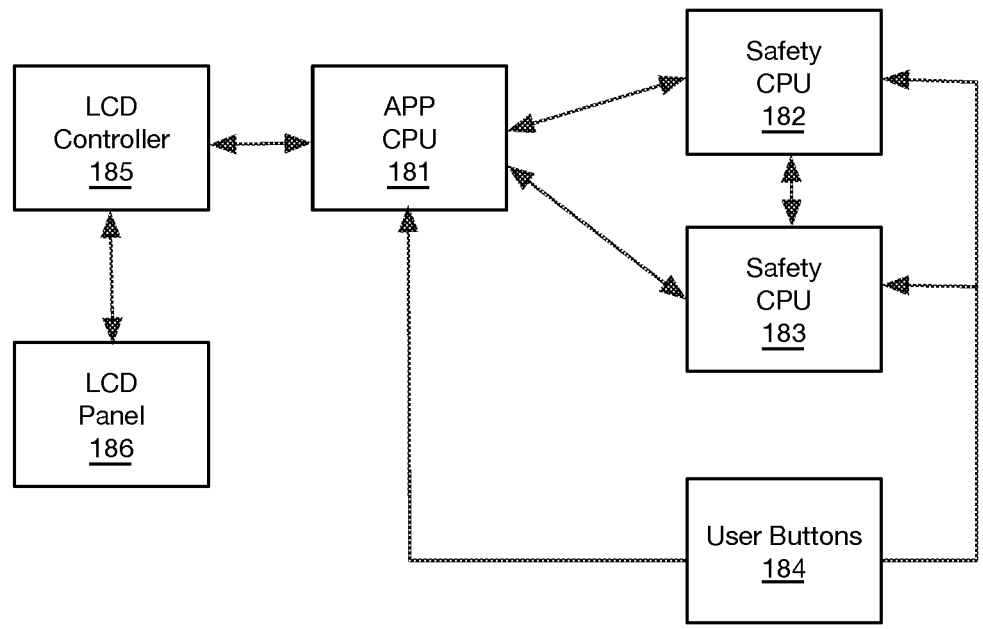

FIG. 1C shows exemplary architecture of a remote control unit that includes an application CPU 181, two safety CPUs (182, 183), user buttons 184, an LCD controller 185, and an LCD panel 186.

In variants, the management platform 170 is implemented as a hardware device that includes one or more of a processor (e.g., a CPU (central processing unit), GPU (graphics processing unit), NPU (neural processing unit), etc.), a display device, a memory, a storage device, an audible output device, an input device, an output device, and a communication interface. In some variations, one or more components included in the remote control unit are communicatively coupled via a bus. In some variations, one or more components included in the remote control unit are communicatively coupled to an external system (e.g., a user device 171, 172 shown in FIG. 1B, a remote control unit 151, 151a, 151b shown in FIG. 1B) via the communication interface (either directly or indirectly via another interface).

The communication interface of the management platform 170 functions to communicate data between the management platform and another device via a network (e.g., a private network, a public network, the Internet, and the like).

In some variations, the storage device of the management platform includes the machine-executable instructions that, when executed by a processor of the management platform, control the management platform to perform at least a portion of the method 200 described herein.

In some variations, at least one component of the system performs at least a portion of the method.

4. Method

Figure 2:
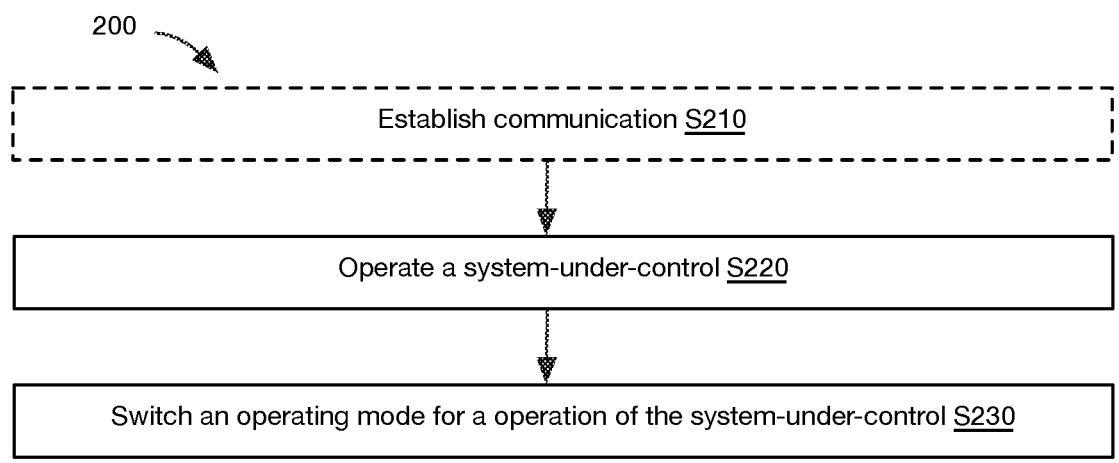
FIG. 2 is a representation of the method, according to various embodiments.

FIG. 2 is a representation of the method, in accordance with various embodiments. In some variations, the method 200 includes establishing communication with at least one system under control (S210); and operating a system-under-control (e.g., 140) S220. The method optionally includes switching an operating mode for operation of the system-under-control (S230).

In some variations, at least one component of the system performs at least a portion of the method.

Establishing communication with at least one system under control S210 includes establishing a communication channel between a remote control unit (e.g., 151, 152 shown in FIG. 1A) and the system under control 140 via a safety system 110. In variants, the communication channel is a wireless communication channel. Alternatively, the communication channel can be a wired communication channel, or a communication channel with both wired and wireless communication segments.

An example configuration is shown in FIG. 1A, in which a remote control unit 151 has established a wireless communication channel with a safety system 110 via an interface 161 associated with the safety system 110. Control commands provided by the remote control unit 151 are received by the safety system 110 and forwarded to the system under control 140. In some cases, the safety system 110 functions to modify commands before forwarding them to the system under control 140 or suppress commands altogether.

The remote control units can include handheld remote control units that are operated by human operators, as well as remote control units that are coupled to (or included in) a management platform (e.g., 170 shown in FIG. 1B). A remote control unit can establish a communication channel with multiple systems under control, such that multiple systems can be controlled via a single remote control unit.

Establishing communication with at least one system under control S210 can include selecting at least one system under control.

In a first variant, the remote control unit establishing the communication automatically selects each controllable system and attempts to establish communication with each such system under control. For example, the remote control unit can scan for recognized safety system interfaces (e.g., 161) that are within range, and attempt to connect with each recognized interface. Connection with a recognized interface can be performed in accordance with a set of rules or permissions. As an example, a connection may fail if another remote control unit is already connected to a recognized interface. However, a connection between a remote control unit and a safety system interface can be established in any suitable manner.

In a second variant, the remote control unit receives information identifying a system-under-control 140 that is to be controlled, and the remote control unit attempts to establish communication with the identified system-under-control. In a first example, the remote control unit receives the information identifying the system-under-control 140 via a user input device of the remote control unit. In a second example, the remote control unit receives the information identifying the system-under-control 140 from a management platform 170. In an example shown in FIG. 1B, a user device (e.g., 171, 172) establishes communication with the management platform 170 and requests the platform 170 to connect to a selected system 140; in response, the management platform 170 requests a remote control unit (e.g., 151, 151a, 151b) to establish communication with the selected system 140.

In variants, the communication channel between the remote control unit and the safety system 110 is established in accordance with configuration information stored at the safety system 110. The safety system 110 can receive the configuration information via one or more of a user input device, a bus, and a network interface. In variants, the configuration information used to establish the communication channel between the remote control unit and the safety system 110 is provided by an administrator, who may or may not be an end user of the remote control unit. The configuration information can be provided prior to operation, or after operation of the safety system (e.g., as a reconfiguration process). In a first example, an administrator uses a remote control unit to provide the configuration information to the safety system 110. In a second example, an administrator uses a user device (e.g., 171, 172) to provide the configuration information to the management platform 170, and the management platform 170 provides the configuration information to the safety system 110 (either directly, or indirectly via a remote control unit).

In variants, the configuration information for a safety system defines connections between remote control units and safety systems. In some implementations, the configuration information for a safety system specifies one or more of: a list of remote control units that are allowed to connect to the safety system; a list of users that are allowed connect to the safety system; a list of remote control units that are not allowed to connect to the safety system; a list of users that are not allowed connect to the safety system; types of commands that can be received generally; types of commands that can be received from a specific remote control unit; types of commands that can be received from a specific user; a list of commands that can be received generally; a list of commands that can be received from a specific remote control unit; a list of commands that can be received from a specific user. In an example, types of commands include: Control commands only; Safety commands only; and Control and Safety commands.

Operating a system-under-control 140 (S220) can include using a safety system (endpoint controller) (e.g., 110) to control the system under control 140. Initial operation of the system under control can be performed in either a supervised mode or an autonomous mode.

In a first variant, initial operation of the system-under-control is performed in a supervised mode. In response to establishing communication with a remote control unit at S210, the safety system (e.g., 110 shown in FIG. 1A, 110, 110a, 110b shown in FIG. 1B) initializes the supervised mode for control of the system-under-control 140. In some implementations, initializing the supervised mode includes establishing active heartbeat monitoring with the remote control unit. In some implementations, in the supervised mode the safety system sets a safety condition if the safety system detects a loss of signal with the remote control unit. In supervised mode, the safety system controls the system-under-control based on input received from at least one remote control unit that has established communication with the safety system. One or more remote control units can be connected to the safety system during the supervised mode, and the safety system can control the system-under-control based on input received from one or more of the connected remote control units. The safety system can be configured with rules that determine how the safety system processes and priorities inputs received from several remote control units. Inputs received from remote control units can include one or more of: control commands for control of the system-under-control; and safety commands for triggering safety conditions (e.g., emergency stop (ESTOP) commands, etc.).

In a second variant, initial operation of the system under control is performed in the autonomous mode. The safety system (e.g., 110 shown in FIG. 1A, 110, 110a, 110b shown in FIG. 1B) initializes the autonomous mode by establishing communication with a control system (e.g., 120 shown in FIG. 1A, 120, 120a, 120b shown in FIG. 1B). In some implementations, initializing the autonomous mode also includes detecting presence of at least one safety rated signal from the control system.

In some implementations, in the autonomous mode the safety system does not set a safety condition if the safety system detects a loss of signal with a remote control unit. In the autonomous mode, the safety system controls the system-under-control based on input received from at least control system that has established communication with the safety system. One or more control systems can be connected to the safety system during the autonomous mode, and the safety system can control the system-under-control based on input received from one or more of the connected control systems. The safety system can be configured with rules that determine how the safety system processes and prioritizes inputs received from several control systems. Inputs received from control systems can include one or more of: control commands for control of the system-under-control; and safety commands for triggering safety conditions (e.g., emergency stop (ESTOP) commands, etc.).

In some implementations, if the safety system is connected to a remote control unit while in the autonomous mode, the safety system sets a safety condition if the safety system detects a safety command received from the remote control unit.

Switching an operating mode for operation of the system-under-control (S230) can include switching between the supervised mode and the autonomous mode.

Switching from the supervised mode to the autonomous mode can include: the safety system (e.g., 110, 110a, 110b) determining whether all autonomous mode criteria is satisfied, and the safety system switching to the autonomous mode in response to satisfaction of all of the autonomous mode criteria. In an example, the safety system switches to the autonomous mode in response to determination that: 1) an active safety-rated input is received from at least one control system; 2) a switch command has been received from at least one requesting remote control unit that is connected to the safety system; and 3) all other remote control units connected to the safety system (other than the remote control unit requesting the switch) confirm the switch to the autonomous mode.

In some implementations, determining that a remote control unit connected to the safety system has confirmed the switch to the autonomous mode includes: determining whether the remote control unit has provided a predetermined confirmation code to the safety system. In some implementation, if the correct confirmation code is not received from each connected remote control unit at the safety system within a predetermined time window (e.g., a time out event), then the requested mode switch to autonomous mode is aborted. Additionally, or alternatively, if an incorrect code is received from at least one connected remote control unit at the safety system within the predetermined time window (e.g., failed confirmation), then the requested mode switch to autonomous mode is aborted.

In some variations, a remote control unit provides a confirmation code (or command to switch to autonomous mode) in response to receiving input from one or more dedicated safety input devices (e.g., buttons, touchpad, etc.) included in the remote control unit.

Alternatively, a remote control unit can use one or more shared input devices (e.g., buttons, touchpad, etc.) included in the remote control unit to provide the confirmation code (or command to switch to autonomous mode). The shared input devices can be used for switching modes, as well as for control of the system-under-control (e.g., 140, 140a, 140b shown in FIG. 1B).

In an example, when a remote control unit issues a command to switch to autonomous mode, one or more safety processors of the remote control unit (e.g., 182 and 183 shown in FIG. 1C) determine a first user action (e.g., a random sequence of button presses, etc.) and sets a timer, and provides an application CPU (e.g., 181 shown in FIG. 1C) with information identifying the first user action. The application CPU 181 then controls a display device (e.g., 186 shown in FIG. 1C) to display the information identifying the first user action. In response to the one or more safety processors detecting the first user action (before expiration of the timer) based on information provided by a user input device (e.g., 184 shown in FIG. 1C), the one or more safety processors issues the command to the safety system to switch to the autonomous mode. A similar process can be performed by the safety processors to ensure that a user intends to control a remote control unit to provide a confirmation code to the safety system.

Switching from the autonomous mode to the supervised mode can include: the safety system (e.g., 110, 110a, 110b) automatically switching to supervised mode in response to one or more triggers. In an example, the safety system automatically switches to supervised mode in response to any of the following events: the safety system detects that a safety-rated input from at least one control system (e.g., 120, 120a, 120b shown in FIG. 1B) coupled to the safety system is no longer active; the safety system receives a command to switch to supervised mode from at least one remote control unit connected to the safety system; the safety system detects a fault at a control system coupled to the safety system; the safety system detects a fault at the system under control (e.g., 140, 140a, 140b shown in FIG. 1B); a safety command (e.g., an ESTOP command) is received from at least one remote control unit connected to the safety system; and a new remote control unit establishes communication with the safety system. In some implementations, the safety system automatically switches to supervised mode if the safety system receives a mode switch command from the remote control unit that provided the command to switch to autonomous mode, whereas mode switch commands from other remote control units do not trigger a mode switch. In other words, in some implementations, only the remote control unit that requests the switch to autonomous mode can send a command to switch back to supervised mode. However, the safety system can automatically switch to supervised mode in response to any suitable trigger or event.

Figure 3:
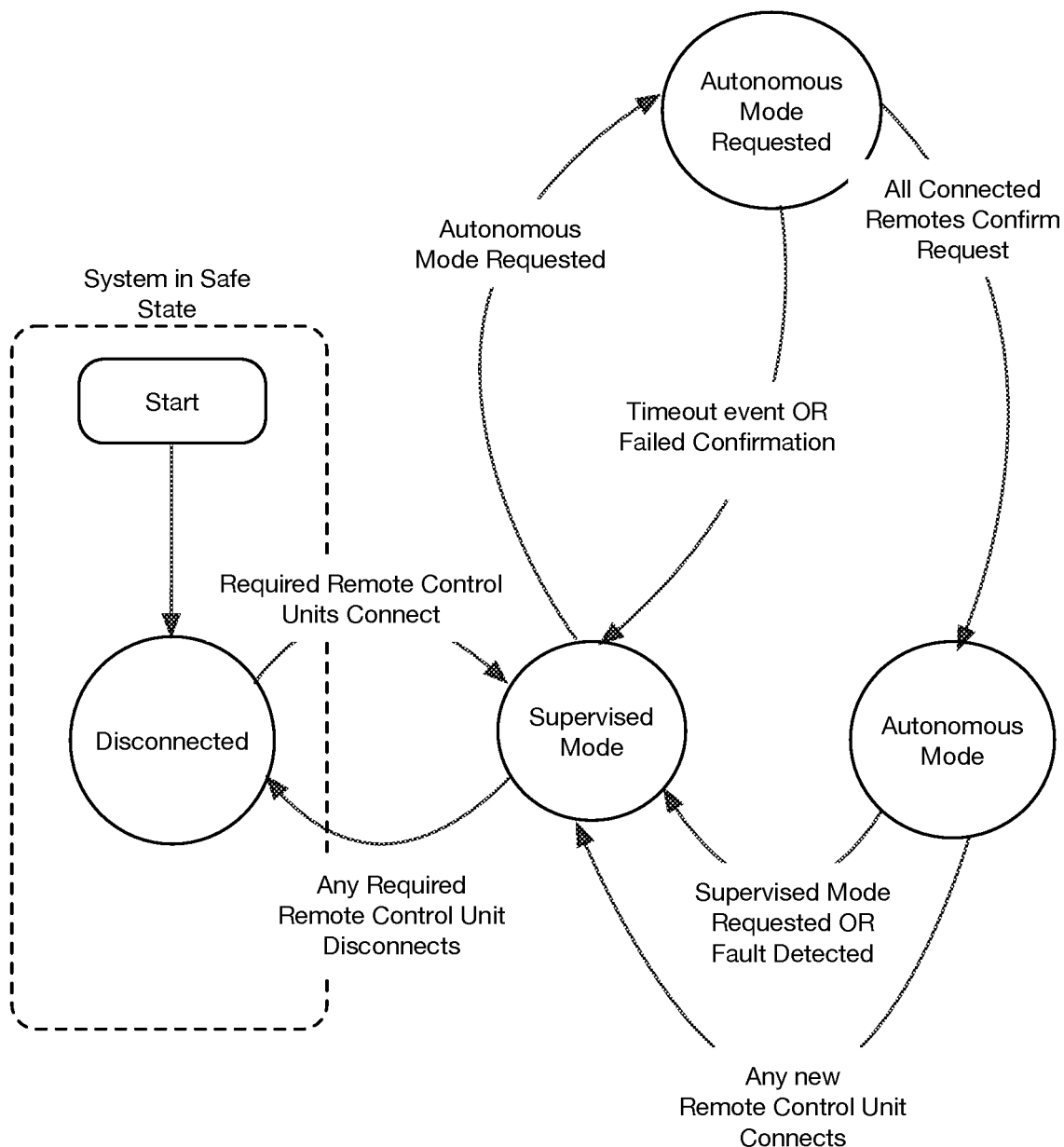
FIG. 3 is a representation of a state transition diagram, according to various embodiments.

FIG. 3 shows an exemplary state transition diagram for switching between supervised and autonomous modes.

Figure 4:
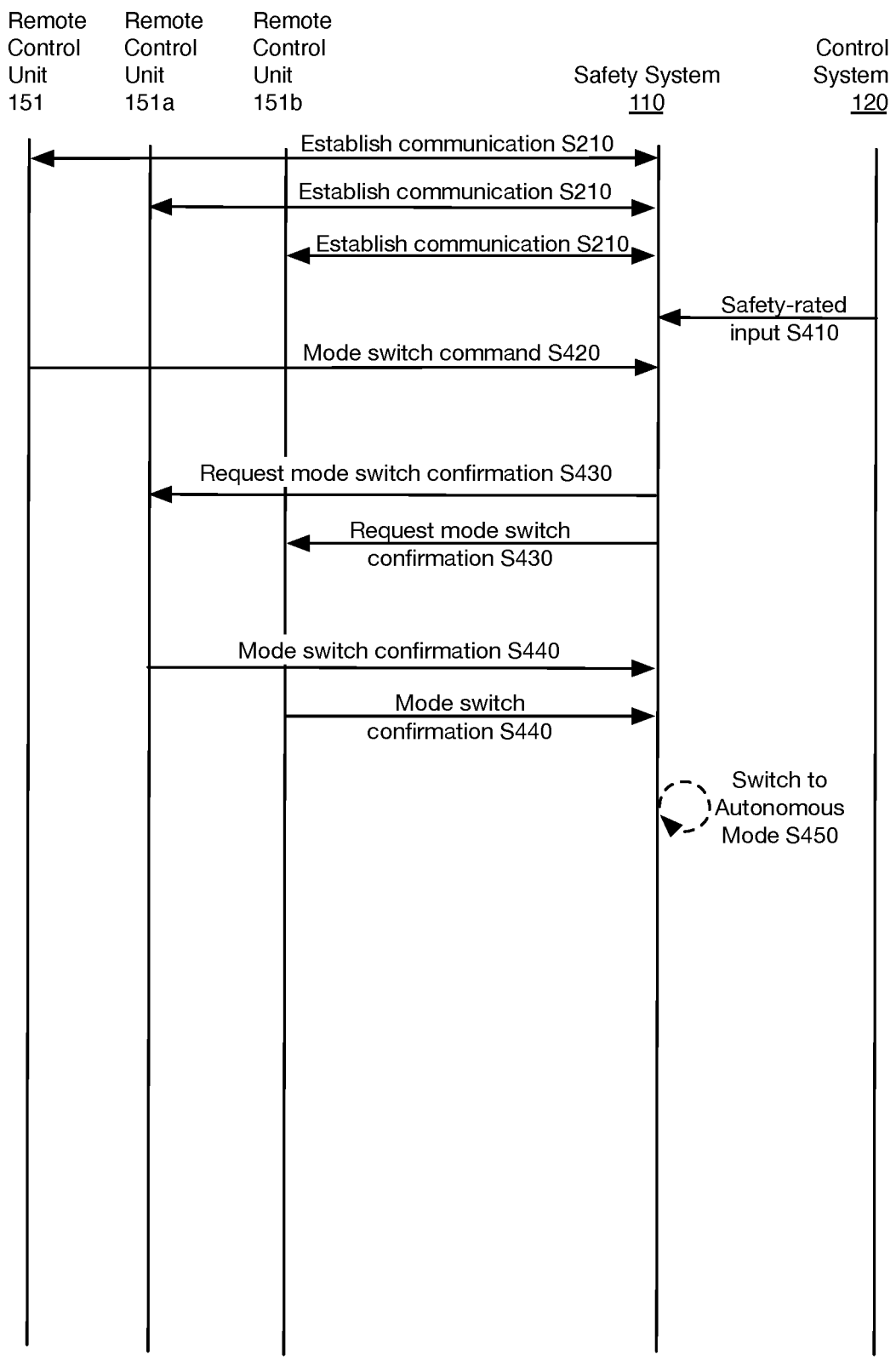
FIG. 4 is a representation of a process for switching from supervised mode to autonomous mode, according to various embodiments.

FIG. 4 shows exemplarity transition from supervised to autonomous mode. As shown in FIG. 4, the safety system 110 has established communication with three remote control units (151, 151a, 151b) at S210. The safety system 110 is also receiving a safety-rated input from the control system 120 (S410). At S420, the safety system 110 receives a mode switch command (to switch to autonomous mode) from a requesting remote control unit (151). At S430, the safety system 110 requests a mode switch confirmation from the remaining remote control units (151a, 151b). At S440 the safety system 110 receives a mode switch confirmation from the remaining remote control units (151a, 151b). As described herein, each remote control unit 151a, 151b can require a user operating the respective remote control unit to explicitly confirm the mode switch by pressing buttons of the remote control unit in a specific sequence; after the remote control unit confirms that the user has pressed the buttons in the specific sequence, the remote control unit sends the mode switch confirmation to the safety system 110. At S450, the safety system 110 confirms that the safety-rated input is still being received from the control system 120, and that mode switch confirmations have been received from the remote control units 151a and 151b, and then switches operation to the autonomous mode.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:
1. A method comprising:
generating a communication channel between a first user device and a safety system, coupled to a system-under- control, via a remote control unit in response to receiving a communication request from the first user device;
in response to generating the communication channel, controlling the remote control unit to operate the system-under-control, via the safety system, based on input received from the first user device; and
in response to receiving an autonomous mode switch confirmation request based on an autonomous mode switch command from a second user device requesting a mode switch from a supervised mode to an autonomous mode of the system-under-control, prompting the first user device for a confirmation code:
based on a predefined sequence of button presses of the first user device; and
confirming the mode switch from the supervised mode to the autonomous mode of the system-under-control.

2. The method of claim 1, further comprising controlling the remote control unit to transmit the confirmation code to the safety system.

3. The method of claim 1, further comprising controlling the remote control unit to transmit a supervised mode switch command to the safety system.

4. The method of claim 1, further comprising controlling the remote control unit to transmit an autonomous mode switch command to the safety system.

5. The method of claim 4, wherein controlling the remote control unit to transmit an autonomous mode switch command comprises controlling the remote control unit to transmit the autonomous mode switch command to the safety system in response to validating the autonomous mode switch request.

6. A method comprising:
operating a system-under-control in a supervised mode based on input received from a remote control unit;
in response to receiving a mode switch command from a first remote control unit, transmitting a request to a second remote control unit for a mode switch confirmation confirming a mode switch from the supervised mode to an autonomous mode; and
in response to receiving the mode switch confirmation from the second remote control unit, operating the system-under-control in the autonomous mode based on input received from an autonomous control system.

7. The method of claim 6, wherein transmitting the request to the second remote control unit comprises transmitting the request to the second remote control unit in response to receiving the mode switch command requesting the mode switch from the supervised mode to the autonomous mode.

8. The method of claim 6, wherein operating the system-under-control in the autonomous mode comprises operating the system-under-control in the autonomous mode in response to receiving the mode switch confirmation confirming the mode switch from the supervised mode to the autonomous mode.

9. The method of claim 6, wherein operating the system-under-control in the autonomous mode comprises operating the system-under-control in the autonomous mode in response to receiving a safety-rated input from the autonomous control system.

10. The method of claim 6, further comprising generating a set of wireless communication channels with a set of remote control units comprising the first remote control unit and the second remote control unit.

11. The method of claim 10, wherein operating the system-under-control in the autonomous mode comprises operating the system-under-control in the autonomous mode in response to receiving a mode switch confirmation from each remote control unit in the set of remote control units.

12. The method of claim 6, wherein transmitting the request for the mode switch confirmation comprises transmitting the request for the mode switch confirmation to each remote control unit in a set of remote control units comprising the first remote control unit and the second remote control unit.

13. The method of claim 6, further comprising switching to the supervised mode in response to detecting an emergency stop command.

14. The method of claim 6, wherein operating the system-under-control in the autonomous mode comprises operating the system-under-control in the autonomous mode in response to receiving the mode switch confirmation comprising a confirmation code.

15. The method of claim 6, further comprising switching to the supervised mode in response to detecting absence of a safety-rated input.

16. The method of claim 6, further comprising switching to the supervised mode in response to receiving a command to switch to the supervised mode.

17. A method comprising:
operating a system-under-control in a supervised mode based on input received from a remote control unit;
in response to receiving a command from a first remote control unit requesting a mode switch from the supervised mode to an autonomous mode, transmitting a request to a second remote control unit for a mode switch confirmation confirming the mode switch from the supervised mode to the autonomous mode; and
in response to detecting absence of the mode switch confirmation, aborting the mode switch from the supervised mode to the autonomous mode.

18. The method of claim 17, wherein aborting the mode switch comprises aborting the mode switch from the supervised mode to the autonomous mode absence of the mode switch confirmation from the second remote control unit within a time window.

19. The method of claim 17, wherein aborting the mode switch comprises aborting the mode switch from the supervised mode to the autonomous mode in response to detecting absence of a correct confirmation code from the second remote control unit.

20. The method of claim 17, further comprising aborting the mode switch from the supervised mode to the autonomous mode in response to detecting absence of a safety-rated input.

* * * * *